United States Patent
Zieger

(10) Patent No.: US 8,899,439 B2
(45) Date of Patent: Dec. 2, 2014

(54) PRESSURE VESSEL FOR GASEOUS OR LIQUID MEDIA

(75) Inventor: Andreas Zieger, Hofstaetten an der Raab (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 12/797,840

(22) Filed: Jun. 10, 2010

(65) Prior Publication Data

US 2010/0314396 A1    Dec. 16, 2010

(30) Foreign Application Priority Data

Jun. 15, 2009   (AT) ............................ GM368/2009

(51) Int. Cl.
| F17C 13/04 | (2006.01) |
| F17C 1/06 | (2006.01) |
| F17C 1/16 | (2006.01) |
| F17C 1/02 | (2006.01) |

(52) U.S. Cl.
CPC ........... *F17C 1/06* (2013.01); *F17C 2203/0619* (2013.01); *F17C 2221/035* (2013.01); *F17C 2205/0382* (2013.01); *F17C 2203/0673* (2013.01); *F17C 2205/0323* (2013.01); *F17C 2260/036* (2013.01); *F17C 2203/0607* (2013.01); *F17C 2250/0636* (2013.01); *F17C 2201/0109* (2013.01); *F17C 2203/0636* (2013.01); *F17C 2205/0332* (2013.01); *F17C 2205/0385* (2013.01); *F17C 2223/0123* (2013.01); *F17C 2203/066* (2013.01); *F17C 2205/0394* (2013.01); *F17C 2203/0604* (2013.01); *F17C 2203/0663* (2013.01); *F17C 2209/227* (2013.01); *F17C 2205/0305* (2013.01); *F17C 2221/012* (2013.01); *Y02E 60/321* (2013.01); *F17C 2203/0621* (2013.01); *F17C 1/16* (2013.01)

USPC .................. 220/581; 220/203.28; 220/586

(58) Field of Classification Search
USPC ............... 220/581, 588, 586, 203.27, 203.28, 220/203.29
See application file for complete search history.

(56) References Cited

U.S. PATENT DOCUMENTS

| 7,971,852 B2* | 7/2011 | Otsubo et al. ................. 251/144 |
| 2003/0089723 A1* | 5/2003 | Funck ........................... 220/581 |
| 2009/0057319 A1* | 3/2009 | Schlag ........................... 220/586 |
| 2009/0071965 A1* | 3/2009 | Iida et al. ....................... 220/586 |
| 2009/0152278 A1* | 6/2009 | Lindner ......................... 220/589 |
| 2010/0032934 A1* | 2/2010 | Veenstra ....................... 280/834 |
| 2010/0072209 A1* | 3/2010 | Hatta ............................ 220/586 |

FOREIGN PATENT DOCUMENTS

| DE | 102007011211 | 8/2008 |
| JP | 2007292235 A | 11/2007 |

* cited by examiner

*Primary Examiner* — Mickey Yu
*Assistant Examiner* — Niki Eloshway
(74) *Attorney, Agent, or Firm* — Bachman & LaPointe, P.C.

(57) ABSTRACT

A pressure vessel 1 for storing a liquid or gaseous medium, having a core vessel 2, a support jacket 3 arranged at least partially around the core vessel, an opening 4 arranged on one side of the pressure vessel, and a valve body 5, arranged at least partially in the opening 4, for open-loop control and/or closed-loop control of the discharging and/or filling of the pressure vessel 1. The valve body 5 is provided as a single piece in the region of the opening 4 and is arranged between the core vessel 2 and the support jacket 3 in such a way that the valve body 5 can be fixed in its position, at least partially, by the core vessel 2 and the support jacket 3.

5 Claims, 2 Drawing Sheets

PRESSURE VESSEL FOR GASEOUS OR LIQUID MEDIA

BACKGROUND OF THE INVENTION

The invention relates to a pressure vessel for storing a liquid or gaseous medium, having a core vessel, a support jacket arranged at least partially around the core vessel, an opening arranged on one side of the pressure vessel, and a valve body, arranged at least partially in the opening of the pressure vessel, for open-loop control and/or closed-loop control of the emptying and/or filling of the pressure vessel.

Various pressure vessels are known from the prior art. For example, DE102007011211B3 discloses a pressure vessel having a core vessel and a support jacket, an attachment ("metal body" or "boss"), serving to fasten a metal fitting, being inserted in an opening of the core vessel. The metal fitting serves to receive or further fasten valve components.

It is an object of the invention to improve the pressure vessels known from the prior art and thereby, in particular, to realize a cost-saving design, and further to minimize the risk of a leakage occurring in the region of the opening of the core vessel.

SUMMARY OF THE INVENTION

The object is achieved in that the valve body is provided as a single piece in the region of the opening and is arranged, at least partially, between the core vessel and the support jacket, such that the valve body can be fixed in its position, at least partially, by the core vessel and the support jacket.

Compared with the prior art, this design reduces the number of parts of such a pressure vessel, since it is possible to dispense with the attachment ("boss") hitherto usual in the prior art. The function of the attachment is fulfilled concomitantly, according to the subject matter of the present invention, by the valve body. In addition, owing to the single-piece design of the valve body, the number of sealing locations in the opening of the core vessel is minimized.

According to a particular embodiment of the pressure vessel according to the invention, the valve body has at least one device of an on-off valve and/or control valve appliance. According to a preferred embodiment, in this case a valve seat and/or a valve line is/are realized in the valve body.

According to a particular embodiment of the pressure vessel according to the invention, the valve body is made from a metallic material.

According to a particular embodiment of the pressure vessel according to the invention, the core vessel is made from plastic.

According to a particular embodiment of the pressure vessel according to the invention, a sealing location is realized between the valve body and the core vessel.

According to a particular embodiment of the pressure vessel according to the invention, the sealing location has at least one sealing ring.

According to an embodiment of the invention, there is provided a pressure vessel for storing liquid or gaseous media, the pressure vessel comprising a core vessel having at least one opening with a metallic body inserted therein, this body being surrounded, at least portionally, by the support jacket made from a fibrous composite material. The pressure vessel is further characterized in that the metallic body is, at the same time, the valve body necessary for the control of the pressure vessel. According to a particular embodiment, a seal is effected, by means of at least one sealing ring, between the core vessel and the metallic body.

BRIEF DESCRIPTION OF THE DRAWINGS

The subject matter of the invention is described exemplarily in the following, in a non-limiting manner, with reference to a plurality of schematic drawings, wherein.

DETAILED DESCRIPTION

Figure 1:
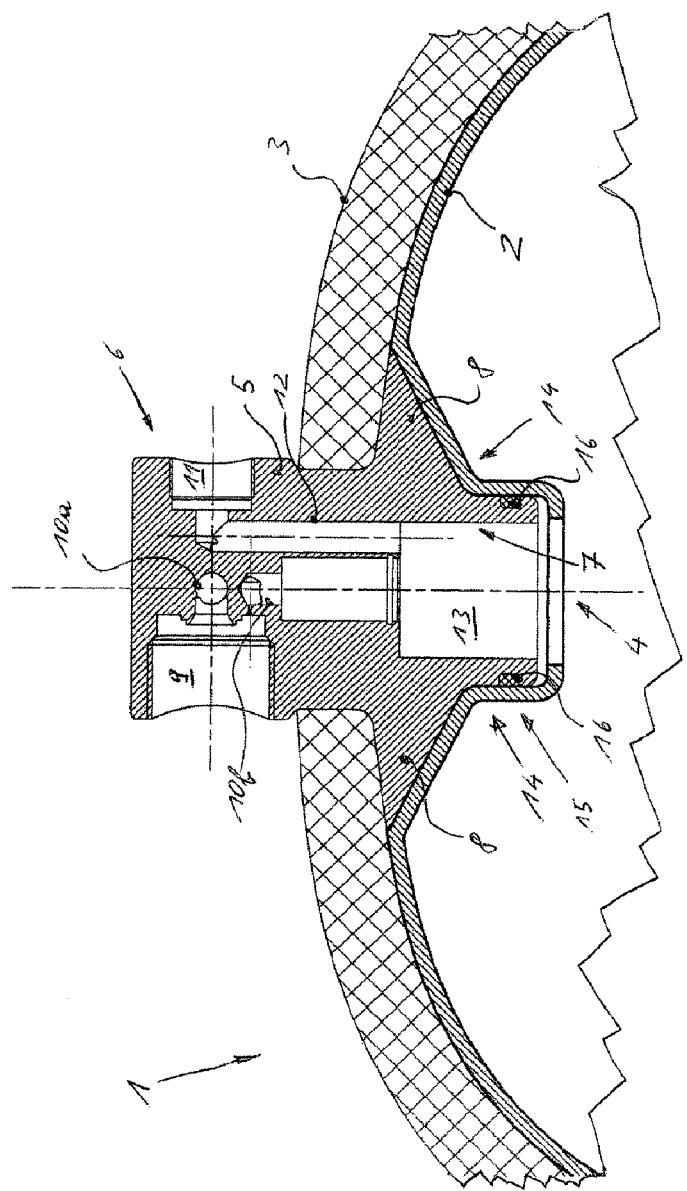
FIG. 1 shows a first embodiment of the pressure vessel, in a sectional view in the region of an opening in the pressure vessel

The pressure vessel 1 represented is FIG. 1 serves to store liquid and/or gaseous media. For example, hydrogen or propane can be stored under high pressure in such a vessel.

The pressure vessel 1 has a core vessel 2, which is made, for example, from polypropylene or polyethylene or from another appropriate plastic. In the selection of the material for the production of the core vessel, consideration is to be given in particular, but not exclusively, to the pressure and the type of the medium in the vessel.

Arranged around the core vessel 2 is a support jacket 3. The design of the support jacket 3 is again substantially dependent on the type and the pressure of the medium in the vessel. In the prior art, it is usual, in the case of pressure vessels having particularly stringent requirements in respect of the pressure resistance of the vessel, to wrap the vessel in a fibrous composite material, in particular a carbon fiber composite material. In such a case, the support jacket 3 is constituted by a winding of carbon fibers. Depending on the application, the support jacket is followed by a further outer jacket (not represented) arranged on the outside of the support jacket, for example a metal jacket, which is provided, in particular, to protect the support jacket against in particular mechanical influences, for example mechanical damage.

Provided in the region of the opening 4 of the pressure vessel 1 is a valve body 5, which has a first, upper region 6 and a second, lower region 7. The second region 7 has corresponding anchor elements 8, arranged between the core vessel 2 and the support jacket 3. Owing to the arrangement of the anchor elements 8 between the core vessel 2 and the support jacket 3, the valve body 5 is at least partially fixed in position. This is relevant, in particular, if the support jacket 3 is constituted by a winding, since, in such a case, the anchor elements 8 of the valve body 5 can be pressed by the winding at least partially and, clearly, in dependence on the stiffness and strength of the core vessel 2 against the core vessel 2. According to other embodiments, the second region 7 of the valve body 5 can, for example, be screwed or adhesive-bonded to the core vessel 2, or pressed or mounted thereon. According to a particular embodiment, the core vessel 2 can, for example, be sprayed or injected onto the valve body 5 (by injection molding or other thermal forming process). Likewise, an additional connection of the valve body 5 to the support jacket 3 is possible, for example through adhesive-bonding and/or through other positive and/or material-closing connections.

The valve body 5 has a first opening 9 for receiving a closed-loop control valve and/or open-loop control valve (not represented), via which, in combination with a corresponding bore 10a, a channel 10b (connection between bore 10a and channel 10b not represented) and/or a valve seat, it is possible to control, in particular, by open-loop and/or closed-loop control, the removal of the medium from the pressure vessel 1. The valve body 5 further has a second opening 11, which is suitable, for example, for receiving a safety valve (not represented). The opening 11 also communicates with the interior of the pressure vessel 1, via a suitable bore 12. Finally, the pressure vessel 1 has a third opening 13, which faces towards the interior of the vessel 1 and via which the medium can be supplied to the pressure vessel or discharged from it.

As can be seen from FIG. 1, the core vessel 2 has, in the region of the opening, and particularly in the region of the anchor elements 8 of the valve body 5, a collar 14 that projects at least partially into the interior of the core vessel 2. Owing to the pressure of the medium in the core vessel 2, the collar 14 is thus pressed against the valve body 2, and particularly against the anchor elements 8 of the valve body 2. The seal of the opening of the core vessel 2 is thereby further improved.

Provided between the core vessel 2 and the valve body 5 is a sealing location 15, which is sealed by means of a sealing element, particularly a sealing ring 16.

Figure 2:
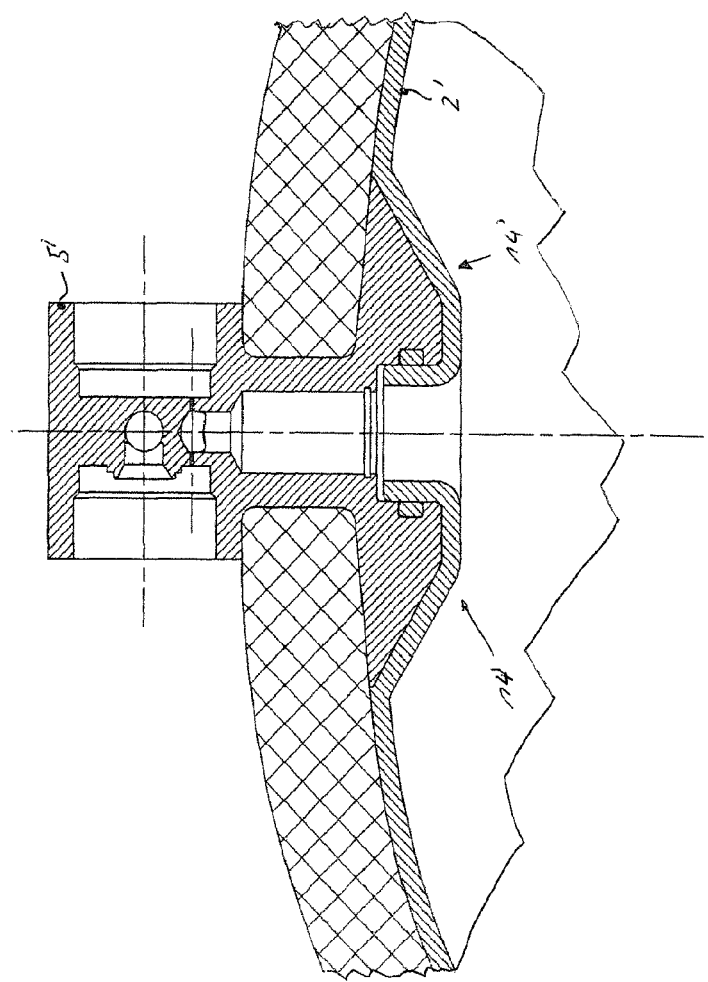
FIG. 2 shows a second embodiment of the pressure vessel, in a sectional view in the region of an opening in the pressure vessel

FIG. 2 shows another design of the valve body 5', which, however, does not differ substantially from the design in FIG. 1. Only the geometry of the collar 14' of the core vessel 2' and the geometry of the valve devices in the valve body 5', particularly the corresponding openings and lines, are realized differently.

The invention claimed is:

1. Pressure vessel for storing a liquid or gaseous medium, comprising a core vessel, a support jacket arranged at least partially around the core vessel, a threadless opening arranged on one side of the pressure vessel, and a valve body, arranged at least partially in the threadless opening of the pressure vessel, for open-loop control and/or closed-loop control for the emptying and/or filling of the pressure vessel, wherein the valve body is provided as a single piece in the region of the opening and is arranged between the core vessel and the support jacket in such a way that the valve body functions as a boss and is fixed in its position without the need of a separate attachment boss, at least partially, by the core vessel and the support jacket, wherein the core vessel further includes a cup structure having a sidewall and a bottom wall within a partial opening, the sidewall seals against the valve body and the bottom wall prohibits the valve body from projecting into the partial opening.

2. Pressure vessel according to claim 1, wherein the valve body has at least one device of an on-off valve and/or control valve appliance.

3. Pressure vessel according to claim 1, wherein the valve body is made from a metallic material.

4. Pressure vessel according to claim 1, wherein the core vessel is made from plastic.

5. Pressure vessel according to claim 1, wherein a seal is located in the sidewall for sealing between the valve body and the core vessel.

* * * * *